Dec. 24, 1968   T. E. SCHULTZ   3,417,959
DIE FOR FORMING RETRO-REFLECTIVE ARTICLE
Filed Nov. 14, 1966   3 Sheets-Sheet 1
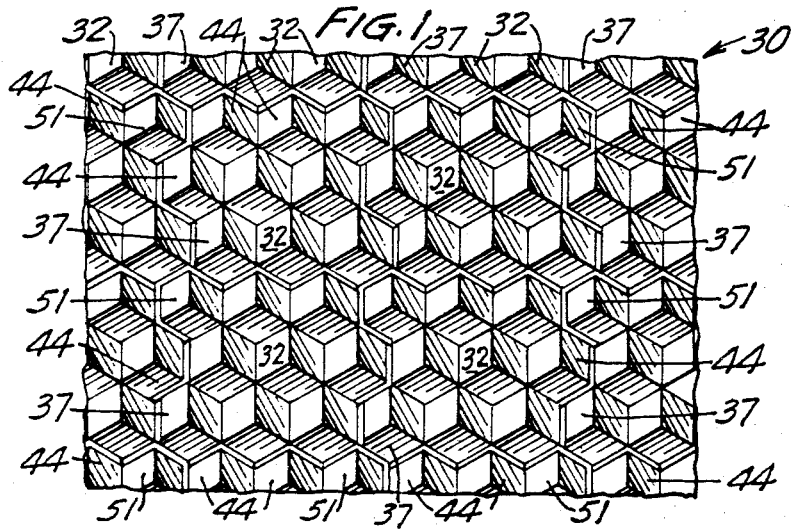
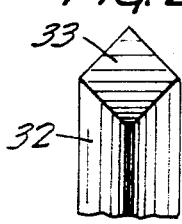
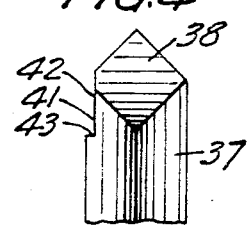
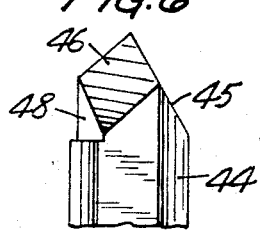
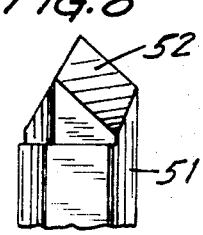
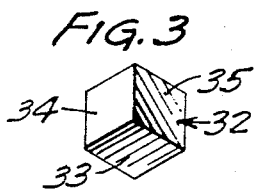
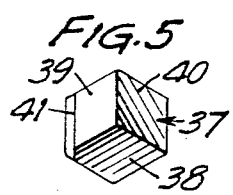
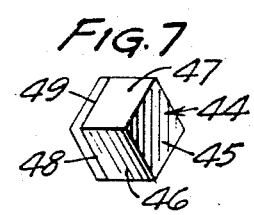
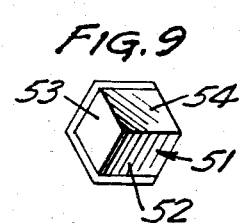
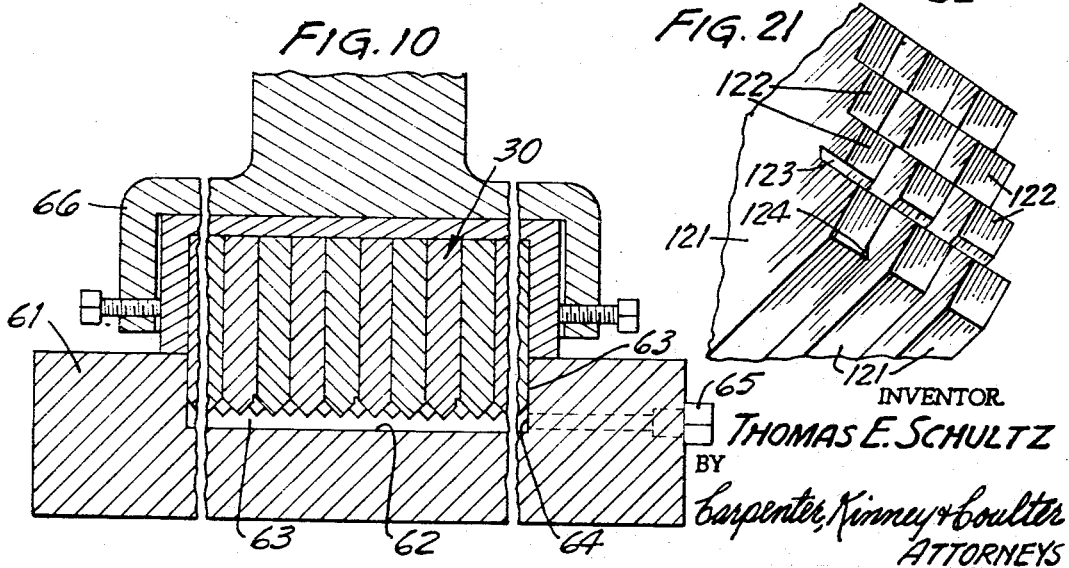
INVENTOR.
THOMAS E. SCHULTZ
BY
Carpenter, Kinney & Coulter
ATTORNEYS INVENTOR.
THOMAS E. SCHULTZ
BY
Carpenter, Kinney & Coulter
ATTORNEYS Dec. 24, 1968 T. E. SCHULTZ 3,417,959
DIE FOR FORMING RETRO-REFLECTIVE ARTICLE
Filed Nov. 14, 1966 3 Sheets-Sheet 3
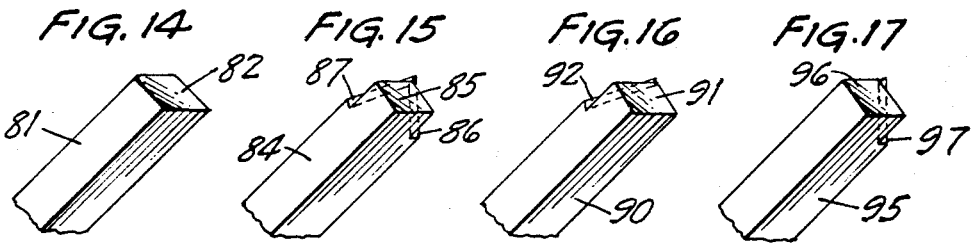
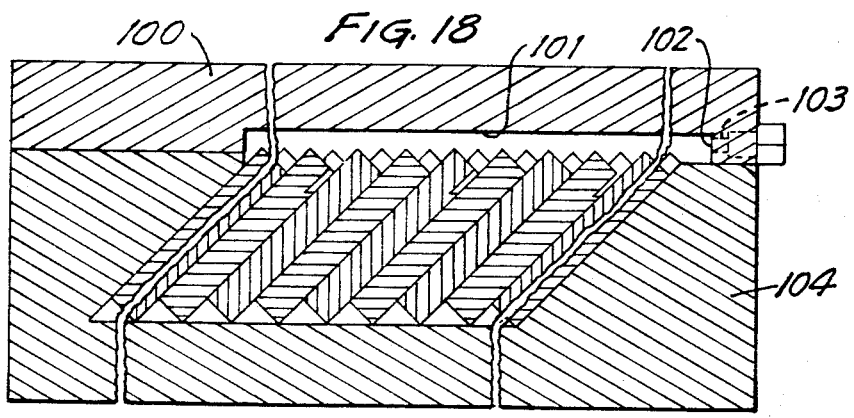
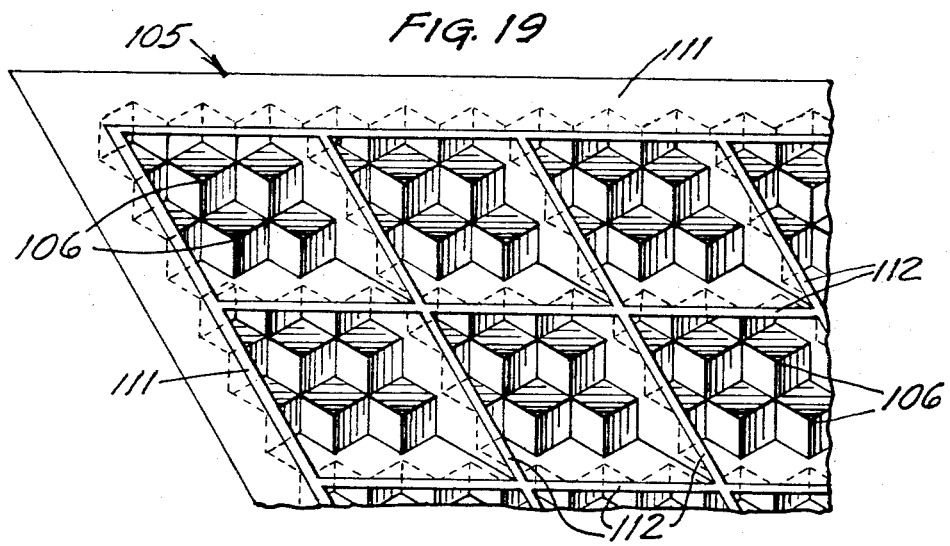
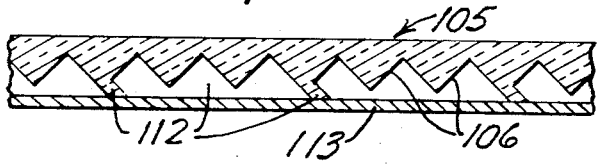
INVENTOR.
THOMAS E. SCHULTZ
BY
Carpenter, Kinney & Coulter
ATTORNEYS United States Patent Office 3,417,959
Patented Dec. 24, 1968

3,417,959
DIE FOR FORMING RETRO-REFLECTIVE
ARTICLE
Thomas E. Schultz, Roseville Village, Minn., assignor to
Minnesota Mining and Manufacturing Company, St.
Paul, Minn., a corporation of Delaware
Filed Nov. 14, 1966, Ser. No. 593,948
10 Claims. (Cl. 249,117)

This invention relates to a die for forming a retro-reflective article.

In one aspect this invention relates to an improvement in retro-reflective plate-like articles having cube-corner retro-reflective units embossed on one surface thereof with the articles divided into cellular sections by septa embossed on the same surface as and separating numbers of said units. The septa are formed to connect adjacent apexes of the units and extend directionally along the dihedral edges forming the shortest path between said apexes. The free edges of the septa are available for bonding a backing sheet to the articles to form retro-reflective sheet material having a long useful life. The articles and backing sheet in combination define a plurality of separate heremetically sealed cells.

The apparatus of the present invention is a die formed of a number of different members joined to provide an array of cube corners with notches or recesses formed in some of said members. The recesses extend directionally in a substantially parallel manner with edges of the planar faces thereof to form slots or channels on said die. These channels extend between and around the projecting cube-corner trihedrons of the die.

The retro-reflecting article made by the die of the present invention affords increased brilliance for a cellular cube-corner retro-reflective sheet by having the septa defining the cells in the article extend directionally along edges of the facets forming the cube-corner units. This structure has an advantage in that only the retro-reflectivity of the very corner or apex and the reflectivity of two or three dihedral edge portions of the cube-corner, from which extend a septum, are destroyed and not the retro-reflectivity of the entire cube-corner since portions of the side walls of said units are still present which define the greatest reflective area of the unit. The amount of retro-reflection actually lost is a fraction of a cube-corner unit, not an entire unit as is the case if the septa are formed at random across the face of a plate embossed to form cube-corner units on a surface.

A novel die structure for producing the cube-corner sheet material of the present invention comprises a plurality of members arranged in a mated relationship to define a cube-corner pattern with notches or recesses formed selectively on said members and arranged to provide interconnected grooves or channels across the cube-corner pattern such that walls or septa are formed in the molded article separating the retro-reflective units into separate cells. The die members may be pins or plates. The pins having recesses formed along side wall portions provide a die affording easy rearrangement of the pins to change the pattern and size of cells in the final product.

The above and further objects and advantages of the present invention will be more readily apparent after reading the following description which refers to the accompanying drawings wherein:

FIGURE 1 is an enlarged fragmentary view of a face of a die member formed in accordance with the present invention from one type of member;

FIGURE 2 and FIGURE 3 are respectively a side view and an end view of one type of pin used in the die of FIGURE 1;

FIGURES 4 and 5 are respectively a side view and an end view of a second type of pin;

FIGURES 6 and 7 are respectively a side view and an end view of a third type of pin;

FIGURES 8 and 9 are respectively a side view and an end view of a fourth type of pin used in the die of FIGURE 1;

FIGURE 10 is a fragmentary sectional view of a mold showing the die of FIGURE 1 in the movable member and in cross-section;

FIGURE 14 is a perspective view of one type of pin used in forming the die of FIGURE 13;

FIGURE 15 is a perspective view of a second type of pin used in the die of FIGURE 13;

FIGURE 16 is a perspective view of a third type of pin used in forming the die of FIGURE 13;

FIGURE 17 is a perspective view of a fourth type of pin used in forming the die of FIGURE 13;

FIGURE 18 is an enlarged fragmentary sectional view of a press showing a die constructed in accordance with FIGURE 13;

FIGURE 19 is an enlarged fragmentary rear view of the product formed by the mold of FIGURE 18;

FIGURE 20 is an enlarged fragmentary vertical section showing the final retro-reflective sheet material formed in accordance with the present invention from the die of FIGURES 13 and 18; and FIGURE 21 is a fragmentary perspective view of another embodiment of members for forming a die in accordance with the present invention.

Figure 11:
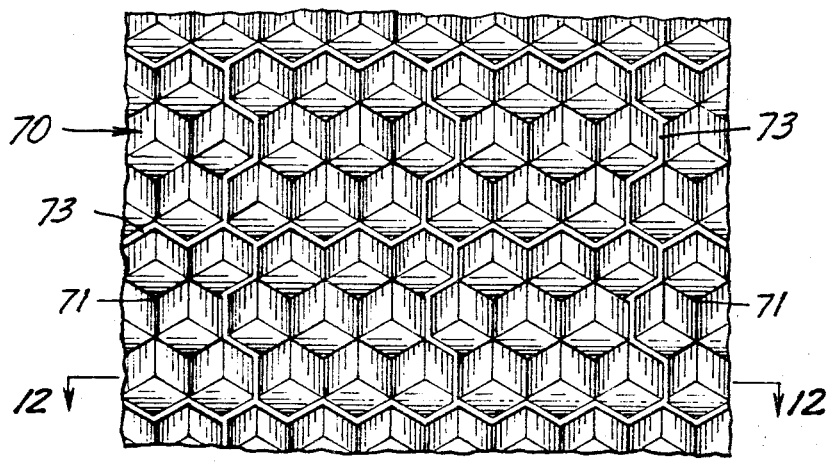
FIGURE 11 is an enlarged fragmentary rear view of the product formed by the die of FIGURES 1 and 10.

The apparatus of the present invention is a die structure constructed of various members and adapted to form one face for a conventional movable mold cavity. The apparatus will form a novel retro-reflective article giving increased performance. Several embodiments of the die members used in forming the die structure of the present invention and several embodiments of the molded article of the present invention will hereinafter be described.

Referring now to FIGURE 1 of the drawing, a portion of the face of a die, generally designated by the reference numeral 30, is illustrated. This die 30 is formed of members nested together to for man array of cube-corner trihedrons. These trihedrons do not correspond to the portion of a cube divided by a diagonal plane, but consist of three full adjacent sides of a cube. The array is produced by nesting together a plurality of members formed at one end with three generally square plane surfaces or facets joined at right angles. The members in this group are pins which have a regular hexagon cross-section. FIGURES 2 and 3 show a typical pin 32 for forming this die, which pin or hexagonal bar is made of a convenient length and at one end is pointed by cutting three plane square surfaces 33, 34 and 35 which are perpendicular to each other, and when the pins are grouped parallelly with a different surface on each of three pins disposed in mating engagement, form a depression which is also a cube corner. Additional elements placed in a similar assembled relationship therewith produce an array of cube-corner depressions which upon molding produce cube-corner retro-reflective units. The die forms an article which has not only the retro-reflective units but also wall members or septa which divide the units into sections or cells. The septa are formed in a manner to minimize the loss in retro-reflectivity and to afford free end surfaces for bonding a backing sheet to the article.

In FIGURE 1 a pluarlity of the pins 32 are grouped to form cube-corner depressions, and these pins are grouped with three other preformed types of pins to form a die in accordance with the present invention.

FIGURES 4 and 5 illustrate the second pins used in forming the die of the present invention. This pin 37 has a cross-section which is a regular hexagon and is made of a convenient length with three plane surfaces 38, 39 and 40 formed at one end thereof, which surfaces are perpendicular to each other, forming a trihedron on the end of the pin. Pin 37 however has a portion of one side wall cut away adjacent the end of the pin to form a notch 41. The notch 41 extends parallel along one side wall of the pin 37 and thus along one edge of the facet 39, reducing its areas so it would no longer be a square, and the wall 42 of the notch would also truncate a corner of the facet 38, as shown in FIGURE 4. The wall 42 is generally parallel with the side wall of the pin, but sufficient draft is permitted for release of an article formed thereby from a mold. The bottom 43 of the notch 41 is perpendicular to the side wall of the pin. The pins 37 are positioned adjacent corners of each of the sections of the die 30, forming a cell. This will be described in greater detail hereinafter.

FIGURES 6 and 7 show a third pin wherein the pin 44 is again a regular hexagon of a convenient length and pointed at one end by three perpendicular surfaces 45, 46, and 47. This pin differs from the pins 32 and 37 however in that it has a recess or notch formed in two adjacent side walls of the pin which extend directionally along the edges of facets 46 and 47. The walls 48 and 49 of the notch are generally parallel with the side walls of the pin, allowing for suitable draft, and join with each other. The pins 44 are positioned in the die matrix to define the sides of the sections.

The fourth type of pin used in the matrix of FIGURE 1 is illustrated in FIGURES 8 and 9. This pin 51 is also hexagonal, made of a convenient length, and pointed at one end by three plane perpendicular surfaces or facets 52, 53, and 54. The end of this pin 51 however is formed with a notch in four consecutive sides of the pin which extend directionally parallel to edges of all three facets. As shown, it extends along one edge of the facets 52 and 54 and along two edges of facet 53. The walls of the notch form triangularly-shaped wall surfaces as shown in FIGURE 8 which are generally parallel to the side walls of the pin, except for the allowance of suitable draft. The pins 51 are used in conjunction with pins 37 to define the adjacent corners of four sections of the die.

Referring again to FIGURE 1 it is shown that a number of each of the four types of hexagonal pins are assembled in a manner such that the notches in the pins 37, 44, and 51 are interconnected to form continuous slots across the face of the die, dividing the die into sections with each section having sufficient uninterrupted facets to define between 2 and 12 perfect cube corners, i.e., each cube corner having three complete adjacent sides of a cube.

FIGURE 10 illustrates schematically a mold for forming an article having a generally plate-like appearance with a plurality of cube-corner retro-reflecting units and septa on the rear surface thereof. The mold may include a fixed portion 61 having a cavity with an interior planar surface 62 for forming the front side of an article. The surface 62 is joined by generally perpendicular walls 63. An opening 64 is formed in one of the walls 63 and communicates with a conduit 65 through which material may be injected into the mold to form the article.

The movable portion 66 of the mold is adapted to receive the die 30, and mates with the fixed portion 61 to define a spacing between the apexes of the various pins 32, 37, 44, and 51 and the surface 62, defining the article thickness. Conventional injection molding techniques may be used to form the article having the retro-reflecting units, or the same could be formed by pressing. Suitable release pins (not shown) may be positioned in the die 30 to eject the article from the mold. These release pins could extend through an edge of a pin and communicate with a recess.

FIGURE 10 also illustrates the cross-section of the die and illustrates that the notches extend slightly below the lowermost corners in the face of the die.

FIGURE 11 is a view of an article, generally designated 70, formed by the die 30. This article is formed of transparent material and is plate-like having a uniform thickness with a smooth planar front side and a rear side, which is shown in FIGURE 11, formed with retro-reflecting units, the apexes of several being designated by the numeral 71. On the rear side are also formed walls or septa 73 which extend continuously along undulating paths around several units 71, and divide the rear surface into cells which preferably contain not less than two nor more than 12 units, and as illustrated, contain four. It will be noted in FIGURE 12 that the finished retro-reflective sheet material comprises the plate 70 and a backing sheet 75 bonded together between the free edges of the septa 73 and the surface of the backing sheet 75, and divide the void between the plate 70 and sheet 75 into definite cells, whereby the four uninterrupted totally reflex-reflective cube corners are enclosed within a single cell. The septa 73 extend perpendicularly from the rear surface of the plate and directionally along the dihedral edges of a unit 71 to connect, along the shortest path, the apexes of adjacent units to define the boundary of each cell. The septa 73 extend rearward at least as far as the apexes and terminate in smooth continuous interconnecting free edges which have a width sufficient to afford an adequate sealing surface to which is bonded the sheet 75. In use, light directed toward the surface 72 would be refracted and reflected within the plate 70 to emerge from the plate 70 back toward the source of the light.

Figure 13:
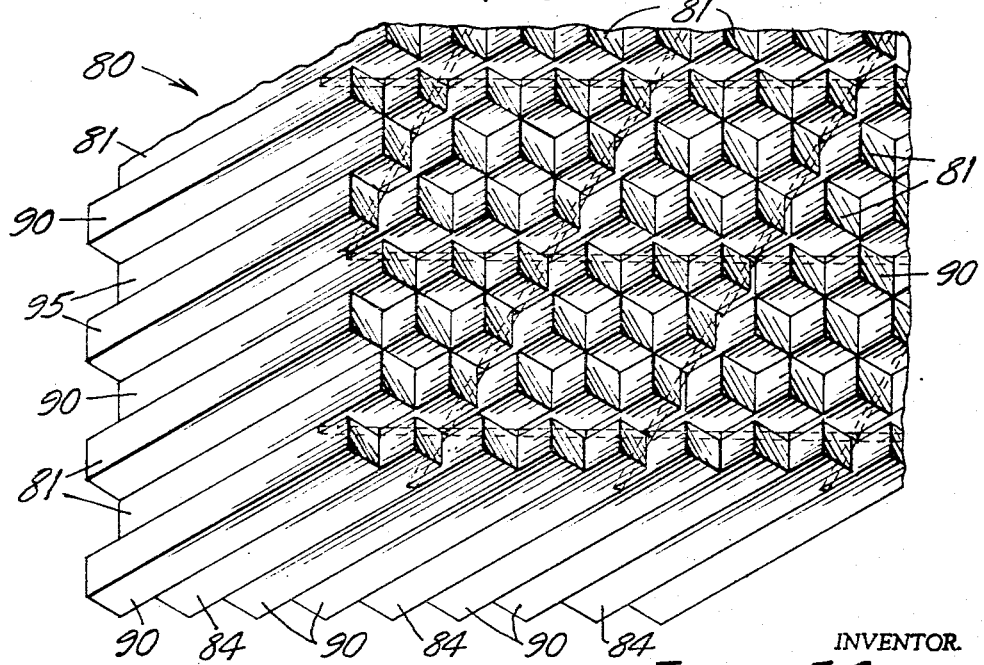
FIGURE 13 is an enlarged fragmentary view of a second embodiment showing a face of a die formed from another embodiment of the members.

Referring now to FIGURES 13 through 18, the second embodiment will be described. FIGURE 13 shows a fragmentary view of the face of a die 80, according to the present invention, formed by pins having a square cross-section with the ends staggered a distance equal to the thickness of the pins and with the longitudinal axis of the pins disposed on a slant. The face formed by the adjacent sides and end of each pin define a plurality of square plane facets affording an array of cube-corner projections and depressions and a plurality of intersecting slots or grooves which extend across the die face dividing it into lozenge-shaped sections or cells.

The grooves in the die are formed by the nesting of preformed pins to define a given pattern. The pins forming this die are illustrated in FIGURES 14 through 17. FIGURE 14 illustrates the typical pin 81 which is square in cross-section with an accurately cut and surfaced square end 82, perpendicular to the longitudinal axis of the pin. Three pins of this construction disposed in a parallel staggered relationship will define a cube-corner depression suitable for forming upon molding a cube-corner retro-reflecting unit.

The second type of pin 84, illustrated in FIGURE 15, is also square in cross-section and is formed with an accurately cut end 85 which is perpendicular to the longitudinal axis of the pin. Adjacent the end 85 and formed generally parallel with respect to two sides of the pin 84 are notches 86 and 87. These notches 86 and 87 extend from a point slightly below a common corner of the pin 84 and surface 85 downwardly along the sides of the pin at an angle of 45° relative to surface 85. The shoulder formed on the side of the pin, defining the bottom of the notches 86 and 87, are not perpendicular with the sides of the pin but are disposed at an angle such that in the assembled position the groove formed in the face of the die by such notches will have a bottom disposed in a plane parallel with that of the apexes of the trihedrons formed by the adjacent sides and end of the pins. This pin is used to form the corners for the sections on the die.

The third pin 90 used in the die of FIGURE 13 is shown in FIGURE 16. Pin 90 is also square in cross-section and has an end which is perpendicular to the longitudinal axis of the pin. The pin 90 has a notch 92 formed in one side (along the left edge) of the pin which corresponds generally to the notch 87 in pin 84. The notch 87 is disposed at an incline relative to the surface 91 to form, respectively, slots along the top and bottom edges of the cells on the die 80 as viewed in FIGURE 13.

The fourth type of pin used in the die 80 is shown in FIGURE 17 and is identified by the numeral 95. Pin 95 is square in cross-section and has an end surface 96 perpendicular to the longitudinal axis of the pin and a notch 97 is formed in one side wall (along the forward edge) of the pin adjacent the surface 96 and extending along said side wall at an angle inclined relative to the plane of the end 96 in a manner corresponding to notch 86 on pin 84. This incline is from the left side downwardly from surface 96 to the right side wall. The pin 95 is used to define the right and left edges of a section on the die, thus forming septa on the sides of a cell. The walls defining a side of the notches 86, 87, 92 and 97 are generally parallel to the side walls of the pins but are formed with sufficient draft to permit release of the cube corner article from the face of the die 80.

FIGURE 18 shows a single cavity mold having a fixed portion 100 which is formed with a cavity having a flat planar surface 101 connected by perpendicular side walls 102. An injection conduit 103 is disposed in one of the side walls 102, permitting the injection of material into the mold. The movable portion 104 of the mold is formed with a cavity, in which is placed in a predetermined array, a number of pins 81, 84, 90, 95, to define a pattern forming a die 80 having a cube-corner forming face as illustrated in FIGURE 13. The pins are disposed on a slant such that the end surfaces and portions of adjacent sides define the cube-corner projections and depressions. The pins positioned as illustrated define several depressions each of which has three complete cube walls. By injecting material into the mold of FIGURE 18 in the conventional manner and allowing the same to set, an article 105 (FIGURE 19) is formed which has a smooth planar front surface and a rear surface formed with cube-corner retro-reflecting units 106 and septa 111 and 112. The septa 111 and 112 extend directionally along the dihedral edges of facets forming certain of the units 106 and connect adjacent apexes of said units.

Suitable release pins (not shown) must be positioned in the die to eject the molded article from the face of the pins. These release pins may be positioned to engage the septa formed on the rear face of the article 105 and may extend through certain of said pins parallel to the axis thereof.

A rear side view of the article 105 formed by the die of FIGURE 13 is illustrated in FIGURE 19. The article 105 may have bordering septa 111 corresponding to the angle and direction of dividing septa 112, and the septa 112 are formed with free securable edges having a width sufficient to afford easy bonding thereto of a backing such as the sheet 113, illustrated in FIGURE 20. It will be noted that the septa should project from the rear face of the article at least to the imaginary surface generated by the apexes of the cube-corner units 106, and as illustrated in the sectional view (FIGURE 20) the septa extend beyond the apexes of the cube-corner retro-reflective units 106. A backing sheet 113 can thus be bonded to the surfaces of the septa to hermetically seal the units 106 in a cell.

A third embodiment of the members for forming a die in accordance with the present invention is illustrated in FIGURE 21. This figure of the drawing illustrates a die 120 formed of plate-like elements 121 with one saw-tooth-type edge formed by square surfaces having equal 90 degree dihedral angles, with the dihedral edges extending transversely of the plates and normal to the sides of the plates. Plates 121 are located to position the surfaces congruously to form trihedral depressions, with the dihedral upper edge of a ridge or tooth 122 aligned with and disposed in the same plane as a groove line on the dihedral edge formed between two teeth. The die face formed will correspond generally to that shown in FIGURE 13. Notches 123 may be routed transversely through the plates along edges of the square facets and obliquely to the plane of the plates to form the septa in the molded article. Additionally, material may be removed from sides of the plates adjacent the saw-toothed edge to form recesses 124 running generally parallelly with the edges of the plates, allowing again for draft, as illustrated at 124.

It is desired that the cells in the articles such as 70 and 105 be as small in size as possible but yet the reflectivity of an article must, as a practical matter, be sufficient such that the non-retro-reflective areas caused by the septa interfering with the retro-reflectivity of certain units do not constitute an area greater than that defined by retro-reflecting units. Preferably retro-reflectivity of the article results in a measure of at least 400 candlepower per foot candle per square foot (930 square centimeters) measured at 0.2 degree divergence from a beam at −4 degrees incidence to the front face. The cells should be as small as possible and therefore preferably have a retro-reflective area not less than 0.06 square inch (4 square millimeters) or greater than one square inch (6 square centimeters) and should include not less than 2 retro-reflecting units. The septa have a free edge which is at least $\frac{1}{100}$ inch (0.2 mm.) and preferably not over $\frac{1}{8}$ inch (3 mm.), and indeed not over $\frac{1}{4}$ inch (6 mm.).

Figure 12:
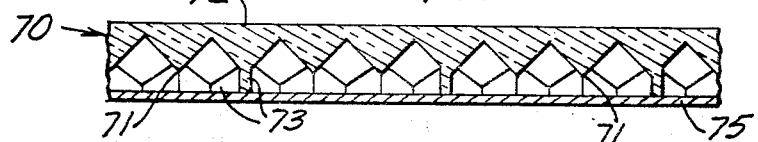
FIGURE 12 is an enlarged fragmentary vertical section showing the final retro-reflective sheet product.

The backing as illustrated in FIGURES 12 and 20 is preferably a material which is essentially vapor impermeable and durable when exposed to the weather. Examples of such materials for the backing are aluminum sheeting, galvanized steel, various laminates and/or durable polymeric film-like sheet materials suitably formed, for example, of polymethyl methacrylate, polyesters, polyamides, polyvinyl fluoride or polyvinyl chloride. This backing may be flexible or rigid, but it must be bonded to the free edges of the septa providing a multiplicity of hermetically sealed cells which are each free from contamination by dust particles or moisture to maintain a substantially continuous prism-air interface on the smooth facets of the retro-reflecting units. There is no silvering or other reflective coating on the units. In fact, such coatings only degrade or diminish the retro-reflectivity of the article.

The free edges of the septa may be bonded to the backing by various means such as heat sealing (using a grid next to the backing corresponding to the pattern of the septa); adhesives, either pressure sensitive or heat or solvent activatable adhesives; or by using a solvent which attacks the septa to make the free edge tacky and, preferably, the backing material to thus form a bond. The adhesive may be applied to the face of the backing, to the face edges of the septa or to both. Further, a polymerizable syrup, e.g., methylmethacrylate syrup, could be applied to the backing or septa to bond the articles. It is important, however, to avoid exposure of the facets forming the retro-reflecting units to the solvents, adhesives or excessive heat.

Having thus described the invention, what is claimed is:

1. A die for forming a retro-reflective article having a plurality of cube-corner retro-reflecting units embossed on one surface thereof together with septa dividing said units into isolated cells when a backing sheet is disposed adjacent to the article and secured to the free edges of said septa, said die comprising a plurality of members, each member having disposed thereon three planar surfaces joined to form a trihedron having a trihedral angle of 90°, arranged to form an array of cube-corner projections and depressions, means defining notches extending directionally along edges of some of said surfaces to define on the face of said die interconnected slots which divide said face into cells with each cell containing several cube-corner depressions.

2. A die according to claim 1 wherein said members are pins of identical cross-section arranged in parallel juxtaposed relationship.

3. A die according to claim 1 wherein said members are plates of equal height and width arranged in parallel juxtaposed relationship.

4. A die for forming a retro-reflective article having a plurality of cube-corner retro-reflecting units disposed on one surface thereof together with integral septa dividing the units into isolated cells when a backing sheet is disposed adjacent to said article annd supported on said septa, said die comprising a plurality of nested aligned pins each having a side wall and an end face defining an array of cube corners, selected ones of said pins having wall means defining notches which extend along at least one side wall of the pin, said ones of said pins being arranged to divide symmetrically the array of cube corners into sections by interconnection of notches on said ones of said pins.

5. A die for making a retro-reflecting article having a rear face embossed with cube corner retro-reflecting units and septa which divide said units into sections, said die comprising a plurality of parallelly, aligned pins each having parallel side walls, an identical cross-section and preformed ends which when congruously positioned form an array of cube corner depressions and projections, a number of said pins having means defining a notch in said preformed ends extending along at least one side wall of said pins to define slots which extend across the face of said die formed by said preformed ends in an intersecting continuous relationship to divide said face into sections.

6. A die as defined in claim 5 wherein said pins are hexagonal the preformed end of which includes a trihedron, the planes forming the same intersecting each other at right angles.

7. A die as defined in claim 5 wherein four types of pins are used in varying numbers to form said die, said types varying one from the other by the existence and nonexistence of notches in said side walls of said pins adjacent said preformed ends and by the extent and position of said notches on the pins with notches.

8. A die as defined in claim 5 wherein said pins are square in cross section and said preformed end has a surface perpendicular to the axis of said pins.

9. A die as defined in claim 8 wherein four types of pins are used to form said die, one type having notches along two side walls of the pin adjacent said preformed end and two types having a notch along a single side wall adjacent the preformed end.

10. A die as defined in claim 7 wherein said pins are hexagonal and have three facets formed on said preformed ends defining a trihedron, one type having a notch in four adjoining side walls, a second type having a notch in two adjoining side walls, a third type with a notch in one side wall, the fourth type being free of notches.

References Cited

UNITED STATES PATENTS

| 595,274 | 12/1897 | Soper. |
|---|---|---|
| 1,591,572 | 7/1926 | Stimson. |
| 3,069,721 | 12/1962 | Arni et al. |
| 3,277,535 | 10/1966 | Rupert. |

FOREIGN PATENTS 156,406    5/1954    Australia.

J. HOWARD FLINT, JR., *Primary Examiner.*

U.S. Cl. X.R.

350—102; 18—44